(12) United States Patent
Vithayathil et al.

(10) Patent No.: US 6,188,204 B1
(45) Date of Patent: Feb. 13, 2001

(54) BRUSHLESS AC FIELD SYSTEM FOR STABLE FREQUENCY VARIABLE SPEED ALTERNATORS

(76) Inventors: Joseph Vithayathil, 33 Neal Cove, Bryant, AR (US) 72022-2827; John J. Vithayathil, 6685 W. Burnside, Unit No. 335, Portland, OR (US) 97210

( * ) Notice: Under 35 U.S.C. 154(b), the term of this patent shall be extended for 0 days.

(21) Appl. No.: 09/370,794

(22) Filed: Aug. 5, 1999

(51) Int. Cl.[7] .......................... H02K 17/00; H02K 17/04; H02K 17/12
(52) U.S. Cl. ................ 322/29; 322/59; 322/61; 322/63; 310/159
(58) Field of Search .................................. 310/179, 165, 310/159; 322/29, 59, 60, 61, 63

(56) References Cited

U.S. PATENT DOCUMENTS

| | | | |
|---|---|---|---|
| 3,801,840 | * 4/1974 | Kant | 310/13 |
| 3,930,175 | * 12/1975 | Chirgwin | 310/160 |
| 4,609,862 | * 9/1986 | Becker et al. | 310/198 |
| 5,012,148 | 4/1991 | Vithayathil | 310/165 |
| 5,598,091 | * 1/1997 | Satake et al. | 310/180 |

* cited by examiner

Primary Examiner—Burton Mullins

(57) ABSTRACT

An AC generator whose field winding (4) on the rotor is excited by AC so that the resultant speed of the rotating field is the algebraic sum of the rotor speed and the speed of the field relative to the rotor itself. This makes it possible to generate AC at a frequency different from that of conventional DC excited generators by the appropriate choice of the frequency of the AC input to the rotor field circuit. It enables the stabilization of the output frequency of the alternator when speed changes occur, by the adjustment of the AC frequency of the rotor input. The AC fed to the rotor is from an auxiliary winding (3) which may be housed on the rotor itself, thereby eliminating the need for any brushes or slip rings. The AC is induced in the auxiliary rotor winding by having an auxiliary winding on the stator (2), distinct from the main stator winding (1). The input to the stator auxiliary winding may be from an inverter (5) whose frequency may be adjustable. By varying the frequency of the inverter output, the frequency of the AC fed to the main rotor field winding may be varied to achieve the desired output frequency of the generator or to stabilize the generator frequency when speed changes occur. Voltage control of the alternator may be implemented by adjustment of the inverter output voltage. The need for a separate exciter machine may be avoided by housing the main and auxiliary winding in the generator itself By the appropriate choice of different pole numbers for the main and auxiliary windings, these two sets of windings can function independently without magnetic coupling, making the machine both exciterless and brushless The restriction on the choice of pole numbers will not apply if the auxiliary windings are housed in a separate exciter machine, in which case it becomes a brushless machine with exciter.

6 Claims, 2 Drawing Sheets

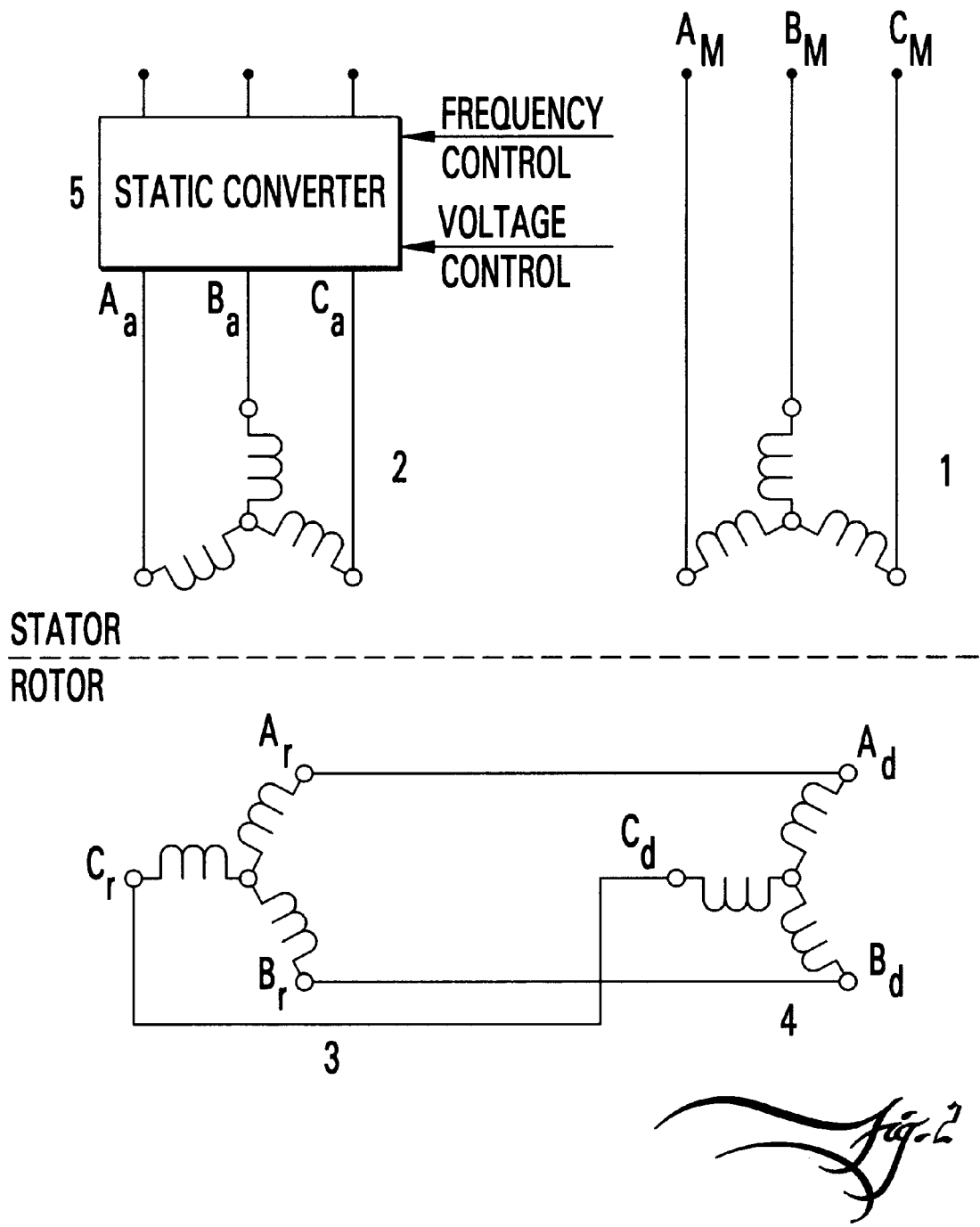

BRUSHLESS AC FIELD SYSTEM FOR STABLE FREQUENCY VARIABLE SPEED ALTERNATORS

BACKGROUND OF THE INVENTION

This invention relates to AC generators, specifically to the incorporation of a field system which does not require brushes or sliding contacts and which permits speed changes without changes in the AC frequency.

In conventional alternators the magnetic poles on the rotor have a fixed orientation with respect to the rotor. The fixed magnetic poles may be provided by having permanent magnets mounted on the rotor. The more common practice is, however to have field windings on the rotor which are supplied with DC current to create the magnetic poles with fixed orientation. The arrangement for providing this DC field current is called the excitation system of the generator. Typically the excitation system consists of a separate machine which is mechanically coupled to the shaft. Historically the exciter machines were DC generators. The DC output from the exciter was fed to the field windings on the rotor through brushes which make sliding contacts with slip rings mounted on the rotor shaft. Since the DC generator also has to have brushes on its commutator, such an excitation system involved the use of several brushes and rubbing contacts, resulting in the need for periodic brush replacements and related maintenance procedures and shut downs. Therefore brushless excitation systems came to be developed. In a typical brushless excitation system the exciter machine is an AC generator in which the AC windings are placed on its rotor. The AC output from these windings is rectified by rotor mounted diodes and fed directly to the field of the alternator without the need for any brushes or slip rings. The adjustment of the field flux is achieved by adjusting the field current of the exciter. This can be done from the stationary frame in both types of exciters. In the permanent magnet machine such a facility for adjustment does not exist. In all such AC generators with DC excitation the frequency of the generated AC is fixed by the rotational speed and the number of poles for which the generator is designed. Therefore, to ensure a constant frequency output, as is needed in most industrial power supply systems, it is essential to maintain the speed constant at the exact value determined by the number of poles of the machine.

BRIEF DESCRIPTION OF THE INVENTION

In many practical situations of electric power generation, although the need exists to maintain the frequency at a constant value, there are practical difficulties to maintain the speed at the correct value, without variations. The optimum speed of the available prime mover may be different from that dictated by the pole number and the required frequency. The objective of this invention is to achieve the generation of AC power at a speed different from that dictated by the desired frequency and the pole number of the generator as in DC excited generators and also to enable speed variations without change in the output frequency.

In contrast to the earlier schemes, the field system of the present invention, besides being a brushless scheme, totally eliminates the need for a coupled exciter machine. Using the new scheme it is possible to use a speed which is different from that of a corresponding DC excited machine. The new scheme enables stabilization of the frequency at the predetermined fixed value during speed variations. Independent control of the field is possible for adjustment of the voltage and the power factor as in conventional DC excited alternators.

In contrast to conventional DC field machines, the new scheme employs an AC field winding, which is excited by an AC source. The new scheme is applicable with single phase and poly phase excitation. For the purposes of this description we will assume that the AC is poly phase. The poly phase AC Source itself is located on the rotor in a separate winding and therefore there is no need for contact brushes or a separate exciter machine. We may designate this AC winding as the auxiliary rotor winding. For creating a poly phase voltage in the auxiliary rotor winding the new scheme employs an auxiliary stator winding which is separate from the main winding of the generator. Mutual magnetic coupling between any of the main windings and any of the auxiliary windings is totally eliminated by appropriate choice of the pole numbers for the windings, as explained in the detailed description of the invention later.

The voltage and frequency of the AC voltage induced in the auxiliary rotor winding are determined by the voltage and frequency of the input to the auxiliary winding on the stator and the speed of rotation of the machine.

Since the input to the poly phase main field winding is from an AC source, the field created by this winding will have a rotational speed relative to the rotor. Since the AC input to the main field winding is from the auxiliary rotor winding, this rotational speed will be determined by the frequency of the induced AC, which itself is determined by the frequency of the AC input to the auxiliary stator winding and the speed of rotation. The stator auxiliary winding will be fed through an inverter whose frequency will be adjustable. Therefore the speed of rotation of the main field with respect to the rotor will be adjustable at any value of the speed of rotation of the rotor by adjusting the frequency of the inverter feeding the auxiliary stator winding. The speed of rotation of the main field in space is the algebraic sum of the rotational speed of the rotor and the rotational speed of the field relative to the rotor. Therefore the rotational speed of the main field relative to the stator is adjustable by adjustment of the inverter frequency. Therefore this invention makes it possible to maintain the output frequency of the generator by the adjustment of the output frequency of the inverter feeding the auxiliary stator winding. The magnitude of the induced voltage is adjustable by adjustment of the magnitude of the AC output from the inverter. In a DC excited conventional alternator the power transferred between the prime mover and the AC source is by the process of mechanical rotation. In the present case there will be power transfer also by transformer action between the field winding and the stator winding. The ratings of the auxiliary winding and the main field winding must be adequate to handle this power also.

The main advantage of this scheme over conventional DC excited schemes is that it becomes possible to use a prime mover speed other than one of the discrete speeds that will have to be used when using a conventional generator. It is also possible to maintain the output frequency at the required value when speed changes occur. This is a brushless scheme for the field and the need for a separate exciter machine is totally eliminated. Other benefits of the scheme will become evident from a consideration of the detailed description and the drawings.

This invention can also be implemented, using a coupled exciter machine, without the need for brushes and sliding contacts. In such a case the auxiliary windings will be located in the exciter machine. The physical separation will then eliminate magnetic coupling between the main and auxiliary windings without the need to have restrictions on the choice of pole numbers for this purpose.

BRIEF DESCRIPTION OF THE DRAWINGS

FIG. 2 shows a static converter through which power is provided to the auxiliary stator circuit. Typically it may consist of a rectifier which converts the input to DC followed by an inverter. It could also be a direct frequency converter without an intermediate DC. The input to the static converter may be from the same AC bus as the one to which the terminals of the main winding are connected or it could be a separate one. A transformer may be included in the static converter block if needed for the purpose of voltage matching. The output frequency of the static converter may be adjustable. This may be implemented by a control signal applied to its switching control circuit. The output voltage magnitude of the static converter also may be adjustable. A voltage control signal may be used for voltage adjustment.

REFERENCE NUMERALS IN DRAWINGS

Figure 1:
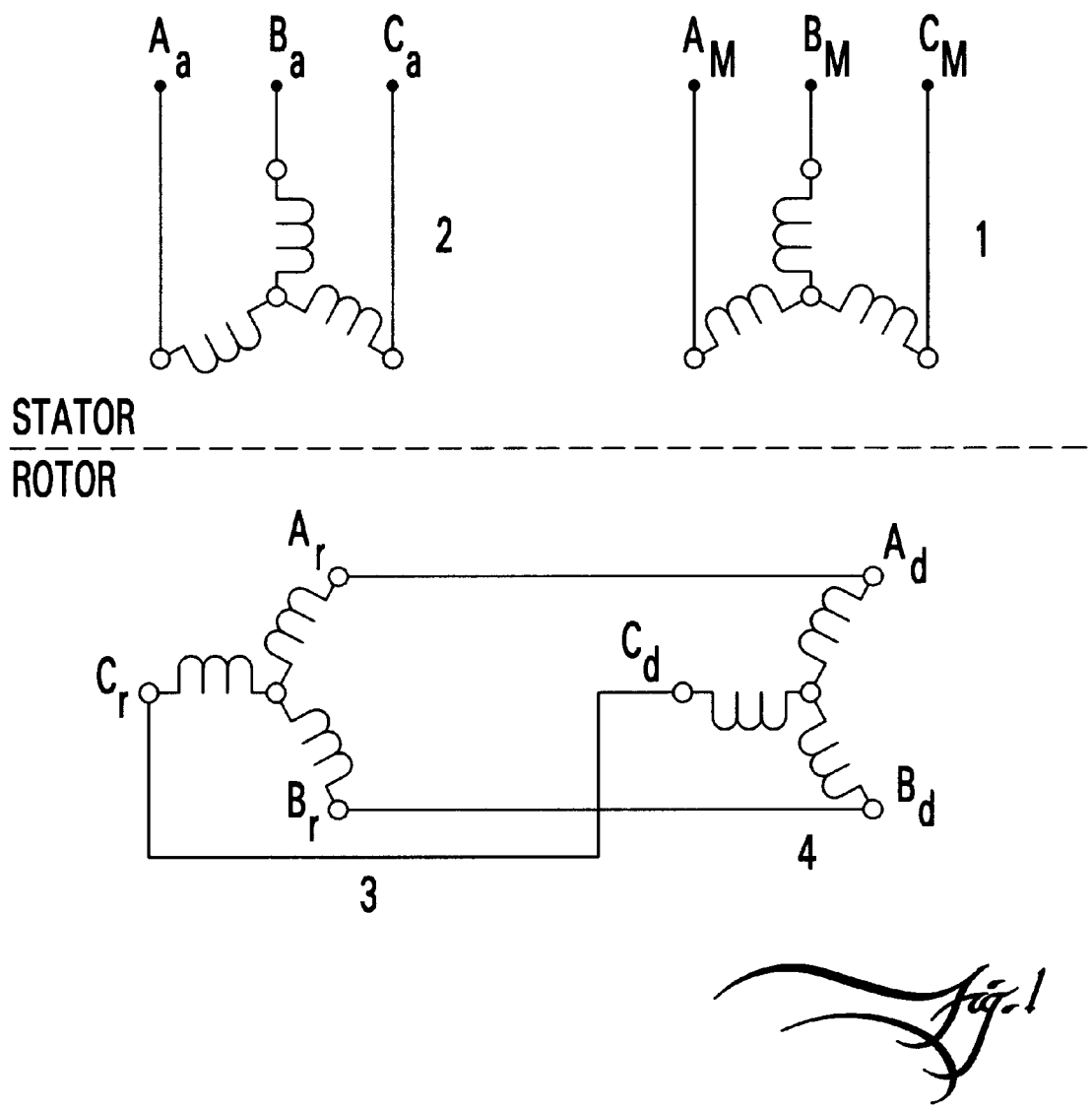
FIG. 1 shows the electrical circuits on the stator and the rotor of the machine in a typical implementation of the invention. In this figure each individual circuit block is identified by a numerical digit adjacent to it. The circuit blocks shown above the broken line are located on the stator and those below it on the rotor.

1. Main three phase stator winding
2. Auxiliary stator winding.
3. Auxiliary rotor winding.
4. Main field winding
5. Static converter with provision for adjusting the frequency and the voltage

DETAILED DESCRIPTION OF THE INVENTION

In accordance with the present invention, the generator machine consists of a main winding designed for the required number of phases and an auxiliary winding, both being on the stator, an auxiliary rotor winding and a field winding on the rotor.

A typical embodiment of the generator of the present invention is illustrated in FIG. 1. The machine has the main three phase winding 1 on the stator which is shown Y connected in the Figure. Alternatively it may also be delta connected. The stator additionally has another winding 2 designated as the auxiliary stator winding, which is shown Y connected, but may alternatively be delta connected. Although both the main and the auxiliary windings are housed on the stator, there is no magnetic coupling between them. The elimination of the magnetic coupling is achieved by appropriate choice of the pole numbers of these two sets of windings. For the purposes of description we may assume that the main winding is wound for 4 poles and the auxiliary winding for 2 poles. With this choice of pole numbers, the span of one pole, say a north pole of the auxiliary winding, will extend over two pole spans of the main winding, that is one north pole plus one south pole. Therefore the net flux of the main winding linking with the auxiliary winding will be zero. Reciprocally, for a similar reason the resultant flux of the auxiliary winding linking with the main winding will also be zero. This, or any other choice of pole numbers which eliminates the magnetic coupling between the main and auxiliary windings, may be used in this invention. If the auxiliary windings are housed in a separate exciter machine, magnetic coupling will be eliminated without any constraint on the choice of pole numbers. For convenience we shall continue to use the above pole numbers in the subsequent description.

The machine also has on its rotor another auxiliary winding 3 which is wound for the same number of poles as the stator auxiliary winding. This winding is shown as a three phase Y connected winding in the figure. But any other phase number and connection scheme will be usable in this invention. In addition the rotor also has on it the main field winding 4 which is shown as a poly phase AC winding, wound for the same number of poles as the main winding on the stator. This winding is shown as a three phase Y connected winding in the figure. Its phase number may be the same as the phase number of the rotor auxiliary winding. It is shown as Y-connected in the figure, but any suitable connection scheme may be chosen.

Because of the choice of pole numbers the magnetic coupling between any main and any auxiliary winding will be zero, irrespective of whether the winding location is on the stator or the rotor of the generator. The AC output terminals of the generator are the terminals of the stator main winding. The frequency of the generated AC is determined by the number of poles of the main windings and the speed of rotation of the main field. Since the main field windings are assumed to be excited with poly phase AC, the main field will be rotating with respect to the rotor itself. The resultant speed of the main rotating field will be the algebraic sum of the rotational speed of the rotor and the rotational speed of the main field with respect to the rotor. We shall designate the following symbols to designate the speed or frequency as appropriate.

N=Rotational speed of the rotor in revolutions/second.

| | | |
|---|---|---|
| $N_f$ | = | Rotational speed of the main field relative to the rotor in revolutions/sec |
| $N_s$ | = | Resultant speed of the main field relative to stator which we shall call the |

$$N_s = N + N_f$$

The generated AC frequency, for the assumed choice of 4 poles for the main windings (2 pole pairs) will be $$F = 2(N + N_f)$$

This relationship shows that we can vary the generated AC frequency F by adjustment of $N_f$. The algebraic sign of $N_f$ can be positive or negative depending on whether it is in the same direction or opposite direction relative to N. This will be determined by the phase sequence of the connection to the main field. For the purpose of this description we shall assume that both N and $N_f$ are in the same direction. Let $f_R$=The AC frequency of the voltage generated in the auxiliary rotor windings. This is the same as the frequency of the AC fed to the main field winding. Therefore, for the assumed choice of pole numbers:

$$N_f = f_R/2 \qquad \text{Equation 1}$$

Thus $F = 2(N + f_R/2) = 2N + f_R$

This relationship makes it evident that the generated AC frequency F can be varied by variation of $f_R$, for a given value of N $f_R$, which is the frequency of the AC induced in the auxiliary rotor winding will be determined by the frequency $F_A$ of the AC fed to the auxiliary stator circuit and the speed of rotation N. The speed of the rotating field relative to the stator, due to the auxiliary stator winding will be equal to $F_A$ for the pole number 2 which we have assumed. This speed may be in the same direction as that of the rotor or opposite. For the purpose of this description we will assume that the auxiliary field rotates in the same direction as N. The speed of the auxiliary field may be lower or higher than N depending on the auxiliary stator frequency $F_A$. We will assume that N is greater than $F_A$. Therefore the slip magnitude of the auxiliary rotor winding with respect to the auxiliary rotating field will be equal to $N-F_A$. The fractional slip magnitude will be numerically equal to $(N-F_A)/F_A$. Therefore the frequency of the AC induced in the auxiliary rotor circuit will be equal to $f_R = N - F_A$. By substituting this value of N in the equation 1 we get:

$$F_A = 3N - F \qquad \text{Equation 2}$$

Equation 2 shows how adjustment of the auxiliary stator frequency $F_A$ can be a means to adjust the value of the generated AC frequency to the required value F at a particular rotor speed N.

Equation 2 has been derived to illustrate the fact that with the basic excitation scheme of this invention a wide choice exists for the speed of rotation of the generator to generate AC at a desired frequency F and also to illustrate that variations in speed can be taken care of by adjustment of the frequency $F_A$ of the auxiliary stator input. Equation 2 is based on the stated assumptions regarding speeds and pole numbers. This invention includes other alternative possibilities that will yield workable relationships between the speeds, the output frequency F and the auxiliary stator input frequency $F_A$, for the chosen pole numbers.

FIG. 2 shows an implementation of the invention, which incorporates the means for the adjustment of $F_A$, the frequency of the input to the auxiliary stator circuit. The circuit block 5, labeled "static converter" may consist of an adjustable frequency inverter fed from a DC bus, this DC bus being provided by a rectifier or otherwise. A transformer may also be necessary, if needed for voltage matching purposes. The transformer (if it is used), the rectifier and the inverter constitute a source of AC to be used for supplying the auxiliary stator winding. Alternatively any other static converter with provision for adjustment of the AC frequency and AC voltage may be used instead of a DC link inverter. The static converter may be supplied from the same AC bus as the one to which the main generator terminals are connected. Alternatively the static converter may be fed from a separate source of power. The output frequency $F_A$ of the static converter may be varied by an appropriate input signal to its switching control circuit. Variation of the frequency $F_A$ may be effected manually or by a closed loop controller. In a closed loop control scheme to maintain the output frequency F of the generator at a predetermined value, we may use the desired value of the frequency F as the reference value. The actual frequency of the generator will be sensed and fed back to the controller. The controller will automatically adjust the frequency $F_A$ of the static converter to cancel the error. The magnitude of the output voltage of the static converter may also be adjusted as and when needed, to vary the excitation level of the generator. A voltage control signal is also indicated in FIG. 2 for this purpose. This may be used for adjustment of the induced voltage of the generator on which may depend the operating parameters of the generator such as the power factor, pull out torque etc. This also may be done automatically by closed loop control in a manner similar to what was described for the frequency control. One point of difference between this invention and a conventional DC excited generator may be stated here. In the conventional DC excited generator the power transfer from the prime mover takes place directly to the stator by the mechanical rotation of the rotor. While the field serves as a medium for the power transfer, there is no transformer action between the rotor main field winding and the stator main winding. In this invention, however, the mechanical speed of rotation is different from that of a conventional DC excited machine. Therefore there will be power transfer by transformer action between the main field windings and the main stator winding. This process of power flow should be taken into account in designing the power ratings of the circuit blocks which constitute the generator of this invention

We claim:

1. A brushless asynchronous AC generator comprising:

a) polyphase main stator and rotor windings wound for the same number of poles;

b) polyphase auxiliary stator and rotor windings wound for the same number of poles;

c) the main and auxiliary windings arranged to be magnetically decoupled by having a different number of poles for the set of main windings and the set of auxiliary windings, such that, one pole of one set of windings encompasses one or more pairs of poles of the other set of windings;

d) an adjustable frequency AC source supplying the auxiliary stator winding; and, e) the electrical output of the auxiliary rotor winding supplied to the main rotor winding.

2. A generator according to claim 1, in which said adjustable frequency AC source supplying the auxiliary stator winding is a static ac/dc/ac inverter connected to the power supply of the main stator winding.

3. A generator according to claim 1, in which the said adjustable frequency AC source supplying the auxiliary winding is an AC source electrically separate from the electrical supply of the main stator windings.

4. A generator according to claim 1, which has the frequency of said adjustable frequency AC source adjusted to control the frequency of the main stator winding.

5. A generator according to claim 1, in which the voltage of said adjustable frequency AC source is adjusted to control the field flux of the main winding.

6. A generator according to any one of the claims 1 to 5, in which said stator and rotor main and auxiliary windings are single phase.

* * * * *